(12) United States Patent
Shoji et al.

(10) Patent No.: US 11,786,997 B2
(45) Date of Patent: Oct. 17, 2023

(54) INSERTION QUALITY DETERMINATOR, INSERTION QUALITY DETERMINING DEVICE, ROBOT SYSTEM, AND METHOD OF DETERMINING INSERTION QUALITY

(71) Applicant: Kawasaki Jukogyo Kabushiki Kaisha, Kobe (JP)

(72) Inventors: Tadashi Shoji, Kobe (JP); Toshiyuki Suzuki, Kobe (JP); Zhijiang Yue, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/800,231

(22) PCT Filed: Feb. 17, 2021

(86) PCT No.: PCT/JP2021/005867
§ 371 (c)(1),
(2) Date: Aug. 17, 2022

(87) PCT Pub. No.: WO2021/166941
PCT Pub. Date: Aug. 26, 2021

(65) Prior Publication Data
US 2023/0109560 A1    Apr. 6, 2023

(30) Foreign Application Priority Data
Feb. 17, 2020 (JP) ................. 2020-024770

(51) Int. Cl.
*B23P 19/02* (2006.01)
*B23P 19/04* (2006.01)
*B25J 13/08* (2006.01)

(52) U.S. Cl.
CPC ............. *B23P 19/02* (2013.01); *B23P 19/04* (2013.01); *B25J 13/088* (2013.01)

(58) Field of Classification Search
CPC ........ B25J 13/088; B25J 9/1687; B23P 19/04; B23P 19/02; G05B 19/41875; G05B 2219/40032
See application file for complete search history.

(56) References Cited

U.S. PATENT DOCUMENTS

2017/0190515 A1* 7/2017 Kuraoka ................. B25J 13/08

FOREIGN PATENT DOCUMENTS

| JP | 2017-152651 A |   | 8/2017 |
| JP | 2017152651 A | * | 8/2017 |

(Continued)

OTHER PUBLICATIONS

Nishizawa et al.; JP2017152651A Component Inspection Device and Component Mounting Device; Aug. 31, 2017: EPO English Machine Translation; pp. 1-8 (Year: 2023).*

(Continued)

*Primary Examiner* — Bayan Salone
(74) *Attorney, Agent, or Firm* — XSENSUS LLP

(57) ABSTRACT

An insertion quality determinator is a determinator 1 that determines a quality of insertion of an insertion component 5 inserted into a hole formed in a work object. The insertion component 5 at least includes a head having the size that is impossible to be inserted into the hole, and a pillar-shaped body that extends from the head and has the thickness that is possible to be inserted into the hole. The determinator is configured to determine the quality of insertion based on positions of given parts P1-P4 of the head of the insertion component 5 inserted into the hole, in a direction perpendicular to an extending direction of the hole.

17 Claims, 7 Drawing Sheets

(56) References Cited

FOREIGN PATENT DOCUMENTS

| WO | WO-2015067624 A1 | * | 5/2015 | ............ | B23P 19/04 |
| WO | 2015/181891 A1 | | 12/2015 | | |
| WO | WO-2015181891 A1 | * | 12/2015 | ............ | B23P 19/02 |
| WO | WO-2017145349 A1 | * | 8/2017 | ............ | B23P 19/04 |

OTHER PUBLICATIONS

Fujita et al.; WO2017145349A1; Robot Arm Control System; Aug. 31, 2017; EPO English Machine Translation; pp. 1-6 (Year: 2023).*

* cited by examiner ( a )

( b )

INSERTION QUALITY DETERMINATOR, INSERTION QUALITY DETERMINING DEVICE, ROBOT SYSTEM, AND METHOD OF DETERMINING INSERTION QUALITY

CROSS-REFERENCE TO RELATED APPLICATIONS

This application is based on PCT filing PCT/JP2021/005867, filed on Feb. 17, 2021, which claims the benefit of priority to Japanese Patent Application No. 2020-024770 filed on Feb. 17, 2020 with the Japan Patent Office, which is incorporated herein by reference in its entirety

TECHNICAL FIELD

The present disclosure relates to an insertion quality determinator, an insertion quality determining device, a robot system, and a method of determining an insertion quality.

BACKGROUND ART

Conventionally, it is known that a robot inserts a protrusion of one workpiece into a recess of the other workpiece. Further, it is known that a quality of insertion is determined in this case. For example, Patent Document 1 discloses a technique of fitting two members, which are preliminarily fitted with each other, by pressing between a base member and a movable member, and then determining the fitting state based on information on a change in a distance between the base member and the movable member.

REFERENCE DOCUMENT(S) OF CONVENTIONAL ART

Patent Document

[Patent Document 1] WO2015/181891A1

DESCRIPTION OF THE DISCLOSURE

However, the technique is intended to be applied, for example, to assembly of a wave-motion gearing device, and therefore, it is not easy to determine the fitting state. Meanwhile, it is known that insertion components, such as grommets, rubber plugs, and threaded components, are inserted and attached to various kinds of holes formed in a work object. Such insertion components require an easy determination of the quality of insertion.

The present disclosure is made in order to solve the above problem, and one purpose thereof is to provide an insertion quality determinator, an insertion quality determining device, a robot system, and a method of determining an insertion quality, which are capable of easily determining a quality of insertion of an insertion component into an insertion hole.

In order to achieve the above purpose, an insertion quality determinator according to one aspect of the present disclosure is an insertion quality determinator that determines a quality of insertion of an insertion component inserted into a hole formed in a work object. The insertion component at least includes a head having the size that is impossible to be inserted into the hole, and a pillar-shaped body that extends from the head and has the thickness which is possible to be inserted into the hole. The determinator determines the quality of insertion based on the position of a given part of the head of the insertion component inserted into the hole in a direction perpendicular to an extending direction of the hole. Here, the term "insertion" includes inserting the component into the hole with a gap therebetween, fitting the component into the hole, press-fitting the component into the hole, and threadedly engaging a threaded component with a threaded hole. The "hole" includes both a through-hole and a hole with the bottom.

According to this configuration, when the insertion component is inclinedly inserted, in the case of a viscoelastic component, such as a grommet or a rubber plug, the head is distorted as seen in the extending direction of the hole, and in the case of the threaded component, the head becomes thinner. Further, in the case of the viscoelastic components, when the insertion component is inserted into the hole with the head floating, the head becomes larger than in the case where it is inserted appropriately. Thus, when the insertion component is not inserted appropriately, the position of a specific part of the head of the insertion component, in the direction perpendicular to the extending direction of the hole is different from that in the case where the insertion component is inserted appropriately. Therefore, according to this configuration, the insertion quality can be determined based on the position of the given part of the head of the insertion component inserted into the hole in the direction perpendicular to the extending direction of the hole. As a result, the insertion quality of the insertion component into the insertion hole can be determined easily.

Further, an insertion quality determining device according to another aspect of the present disclosure includes an imaging apparatus that images a captured image of the insertion component inserted into the hole, seen in the extending direction of the hole, and outputs imaging data indicative of the captured image, and any one of the insertion quality determinators described above. The determinator acquires the dimension or the position of the given part of the head of the insertion component inserted into the hole in the direction perpendicular to the extending direction of the hole based on the imaging data outputted from the imaging apparatus.

According to this configuration, the insertion quality determining device can be provided, which is capable of easily determining the quality of insertion of the insertion component into the insertion hole.

Further, a robot system according to still another aspect of the present disclosure includes a robot including a robotic arm having an end effector that inserts the insertion component into the hole of the work object, and the insertion quality determining device described above. The imaging apparatus is installed in an object other than the end effector, the robotic arm, or the robot.

According to this configuration, the robot system can be provided, which is capable of easily determining the quality of insertion of the insertion component into the insertion hole.

Further, an insertion quality determining method of determining an insertion quality according to still another aspect of the present disclosure is an insertion quality determining method of determining a quality of insertion of an insertion component inserted into a hole formed in a work object, and the insertion component at least includes a head having the size that is impossible to be inserted into the hole, and a pillar-shaped body that extends from the head and has the thickness that is possible to be inserted into the hole. The method includes the step of determining the quality of insertion based on the position of a given part of the head of the insertion component inserted into the hole, in a direction perpendicular to an extending direction of the hole.

According to this configuration, the insertion quality determining method can be provided, which is capable of easily determining the quality of insertion of the insertion component into the insertion hole.

Effect of the Disclosure

According to the present disclosure, an insertion quality determinator, an insertion quality determining device, a robot system, and a method of determining an insertion quality can be provided, which are capable of easily determining a quality of insertion of an insertion component into an insertion hole.

MODES FOR CARRYING OUT THE DISCLOSURE

Figure 1:
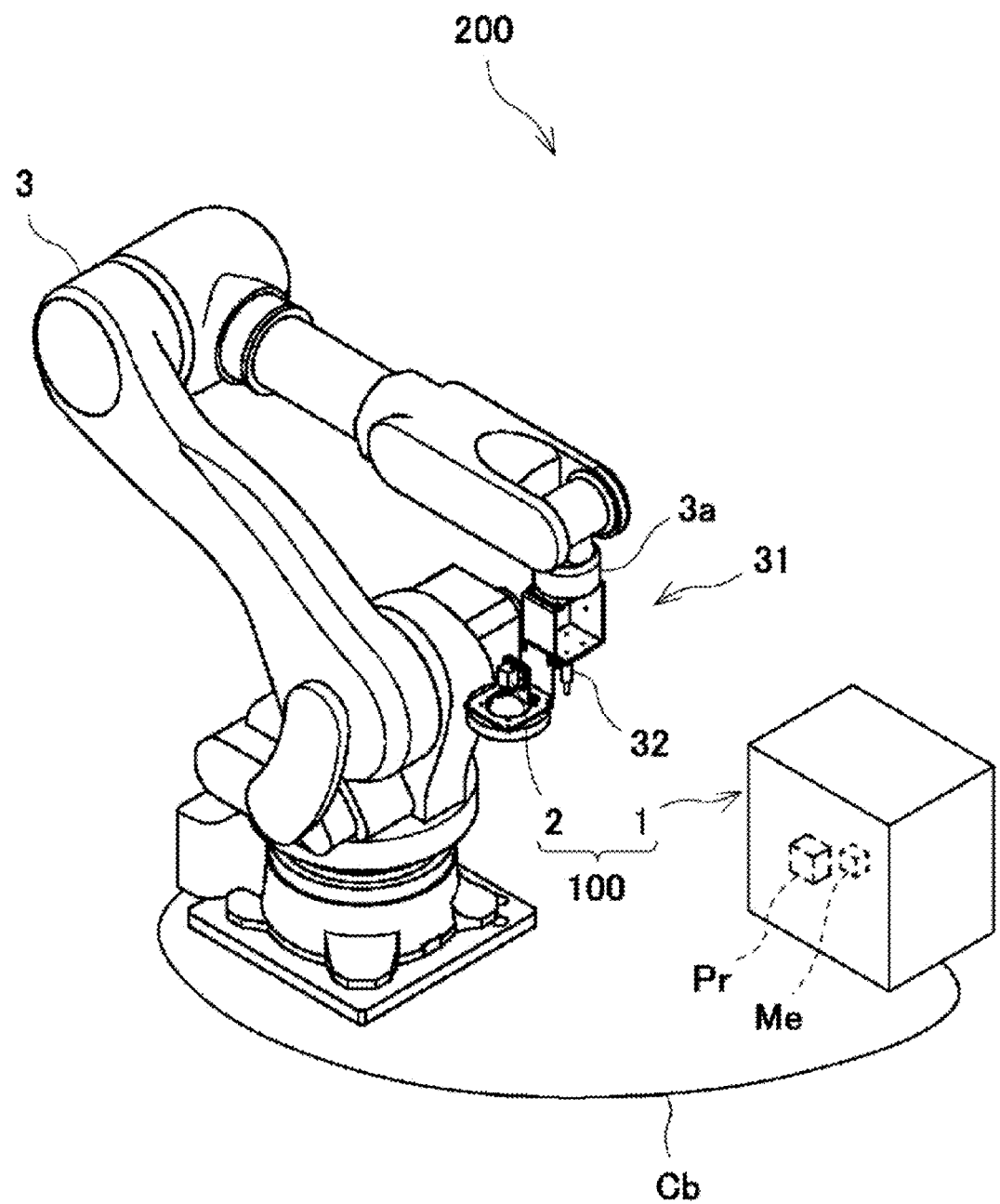
FIG. 1 is a perspective view illustrating one example of a robot system provided with an insertion quality determining device according to Embodiment 1 of the present disclosure.

Hereinafter, embodiments of the present disclosure will be described with reference to the drawings. Note that, below, the same reference characters are assigned to the same or corresponding elements throughout the drawings to omit redundant explanations. Further, since the following drawings are for explaining the present disclosure, element unrelated to the present disclosure may be omitted, the dimension may not be exact because of an exaggeration etc., it may be simplified, or modes of mutually-corresponding elements may not match with each other in a plurality of drawings. Moreover, the present disclosure is not limited to the following embodiments.

Embodiment 1

[Configuration]

FIG. 1 is a perspective view illustrating one example of a robot system provided with an insertion quality determining device according to Embodiment 1 of the present disclosure.

Figure 2:
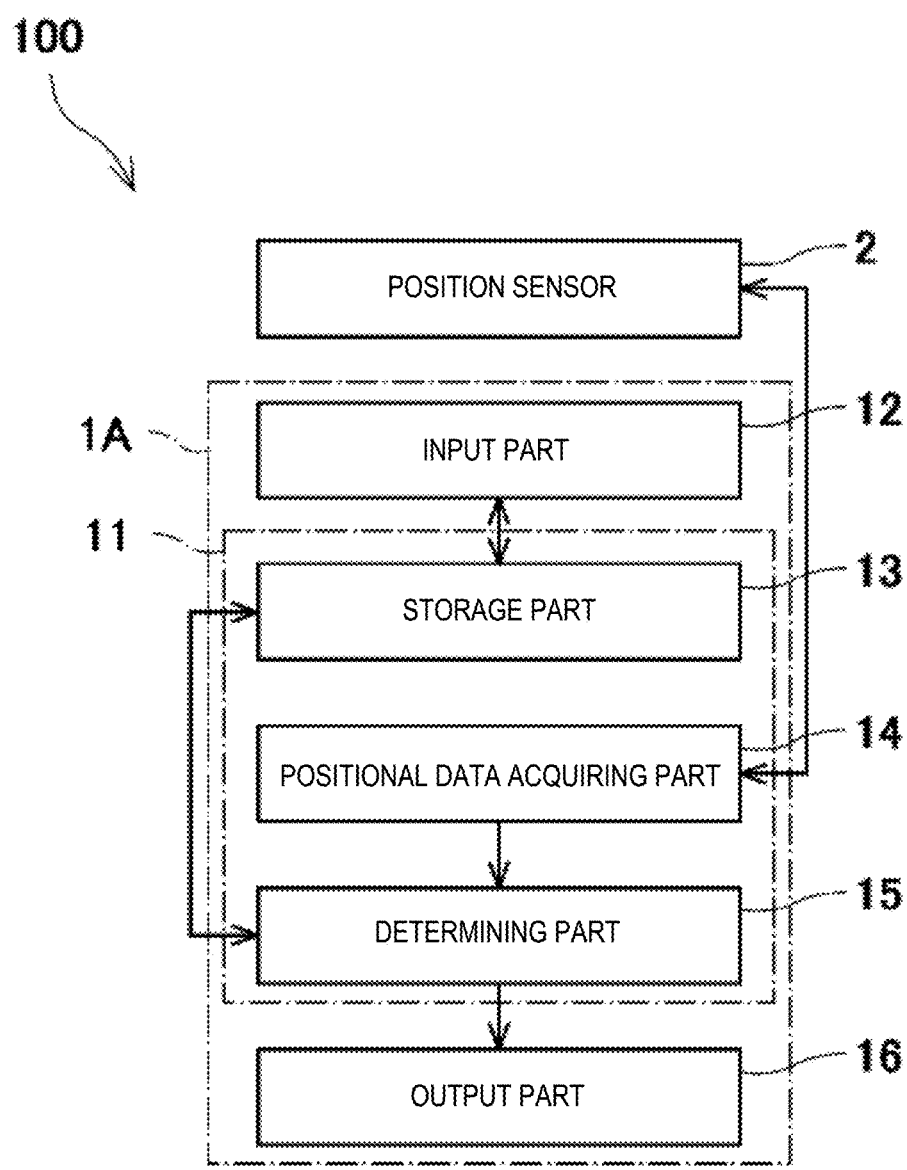
FIG. 2 is a functional block diagram illustrating a configuration of the insertion quality determining device of FIG. 1.

FIG. 2 is a functional block diagram illustrating a configuration of the insertion quality determining device of FIG. 1.

Figure 3:
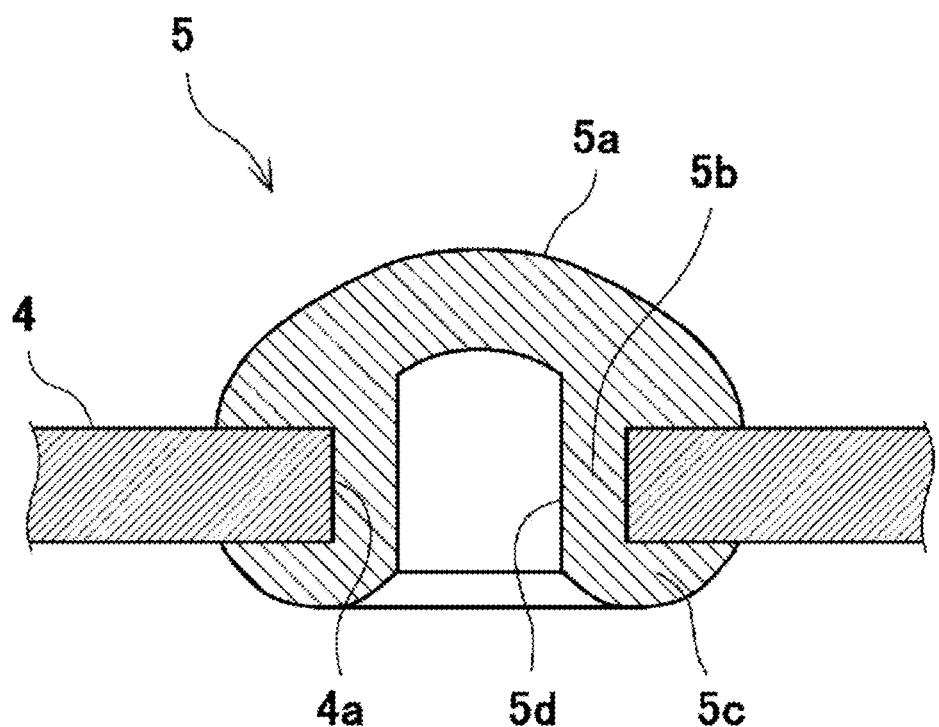
FIG. 3 is a cross-sectional view illustrating a state where an insertion component is inserted into a hole of a work object.

FIG. 3 is a cross-sectional view illustrating a state where an insertion component is inserted into a hole of a work object.

Referring to FIG. 1, a robot system 200 according to Embodiment 1 includes an insertion quality determinator 1, a position sensor 2, and a robot 3. The insertion quality determinator 1 and the position sensor 2 constitute an insertion quality determining device 100.

The insertion quality determinator 1 includes a processor Pr and a memory Me. The robot 3 is provided with an end effector 31. The end effector 31 has a component inserting tool 32. The position sensor 2 is attached to the end effector 31. The insertion quality determinator 1 and the robot 3 are electrically connected through a cable Cb, and the insertion quality determinator 1 is electrically connected with the position sensor 2 via the cable Cb and wiring inside the robot 3. The insertion quality determinator 1 and the position sensor constitute the insertion quality determining device 100.

Referring to FIGS. 1 and 3, near the robot 3, a work object 4 where a hole 4a is formed, and an insertion component place (not illustrated) are disposed. The robot 3 holds, by the component inserting tool 32 of the end effector 31, an insertion component 5 (see FIG. 3) placed on the insertion component place, and inserts the held insertion component 5 into the hole 4a in the extending direction of the hole 4a.

Then, the insertion quality determinator 1 determines insertion quality of the insertion component 5 based on positional data detected by the position sensor 2.

Below, the configuration of the robot system 200 is described in detail.

<Work Object 4>

The work object 4 is not limited in particular. The work object 4 may be a casing of an apparatus, a body of a vehicle, a building, and a civil engineering structure such as a bridge. Below, a case where the work object 4 is a sheet metal which is used for the vehicle body is illustrated.

<Hole 4a>

The hole 4a may be any hole into which the insertion component is inserted. The hole 4a may be either a through-hole or a hole with the bottom. The hole 4a may be a wiring hole into which wiring is inserted, a positioning hole for assembly, and a threaded hole. Below, a case where the hole 4a is a positioning hole for the work object 4 which is the sheet metal is illustrated. The hole 4a is formed in a pillar shape having various kinds of cross-sectional shapes, for example. Here, the hole 4a is formed in a circular-cylindrical shape.

<Insertion Component 5>

Referring to FIG. 3, the insertion component 5 may be what is inserted into and attached to the hole 4a of the work object 5. The insertion component 5 includes, at least, a head 5a having the size which is impossible to be inserted into the hole 4a, and a pillar-shaped body 5b which extends from the head 5a and has the thickness which is possible to be inserted into the hole 4a. The insertion component 5 may have, at a tip end of the body 5b, a retainer part 5c which is thicker than the body 5b. The insertion component 5 may be a grommet, a rubber plug, and a threaded component (including a small screw, a screw, a bolt, etc.).

The insertion component 5 such as the grommet or the rubber plug is viscoelastic, and its head 5a is deformed as will be described later by the body 5b being inserted into the hole 4a while being viscoelastically reduced in the diameter. Since such a viscoelastic insertion component 5 differs in the deformation mode of the head 5 depending on the quality of insertion into the hole 4a, the present disclosure can be applied suitably.

Here, the term "insertion" includes inserting the insertion component 5 into the hole 4a with a gap therebetween, fitting the insertion component 5 into the hole 4a, press-fitting the insertion component 5 into the hole 4a, and threadedly engaging the threaded component with the threaded hole.

Below, a case where the insertion component 5 is the rubber plug is illustrated. The insertion component 5 which is the rubber plug is formed in a circular-cylindrical shape as a whole, as illustrated in FIG. 3. In detail, when the inserting direction into the hole 4a is oriented downward, the insertion component 5 has the head 5a of a short circular-pillar shape, the body 5b having a smaller diameter than the head 5a, and the retainer part 5c of a disk shape having substantially the same diameter as the head 5a. The head 5a is formed so that an upper surface is rounded, and the retainer part 5c is formed so that a lower surface is rounded. Further, a circular-cylindrical hollow hole 5d is formed so that it opens in a center part of the lower surface of the retainer part 5c, and it extends up to the middle of the head. The hollow hole 5d is formed so that the body 5b is easily reduced in the diameter when the insertion component 5 is inserted into the hole 4a. Because of the existence of the hollow hole 5d, the head 5a becomes easier to be deformed when the insertion component 5 is inclinedly inserted into the hole 4a. Further, the retainer part 5c becomes a factor of the insertion component 5 becoming difficult to be inserted into the hole 4a, and, as a result, becomes a factor of degrading the insertion quality.

<Robot 3>

The robot 3 may be any robot to which the end effector 31 is attachable. The robot 3 may be a vertical articulated robot, a horizontal articulated robot, a parallel-link robot, a Cartesian-coordinate robot, a polar-coordinate robot.

Below, the robot 3 is the vertical articulated robot here, and the end effector 31 is attached to a wrist.

The robot 3 may automatically operate according to a control program, or may be manually operated by an operator. Below, a case where the robot 3 automatically operates according to the control program is illustrated.

<End Effector 31>

Referring to FIG. 1, the end effector 31 may have any configuration as long as it can hold the insertion component 5 and insert it into the hole 4a. Here, the end effector 31 is provided with the component inserting tool 32. The component inserting tool 32 is formed, for example, in a pillar shape, and has a recess having a shape corresponding to the shape of the upper surface of the head of the insertion component 5 formed at a tip end thereof. In the component inserting tool 32, an air suction path is formed inside, and the component inserting tool 32 is configured to suck the insertion component 5 at the tip end. The end effector 31 is provided so as to extend in a direction in parallel with the torsion axis of the wrist 3a of the robot 3. The end effector 31 sucks and holds the insertion component 5 at the tip end of the component inserting tool 32, and inserts it into the hole 4 of the work object 4 in the extending direction (axial direction) of the hole 4a.

<Position Sensor 2>

The position sensor 2 is attached, for example, to the end effector 31 of the robot 3, the robotic arm, or an object other than the robot 3. Here, the position sensor 2 is attached to the end effector 31 of the robot 3. Here, the position sensor 2 is provided so that the position detecting direction becomes parallel to the torsion axis of the wrist 3a.

The position sensor 2 may be a non-contact displacement sensor, an image sensor, an imaging apparatus (camera), etc. In Embodiment 1, a case where the position sensor 2 is a laser-type displacement sensor is illustrated. The position sensor 2 detects the position of a given part of the head of the insertion component 5, which will be described later in the direction perpendicular to the extending direction of the hole 4a, and outputs positional data indicative of the detected position.

<Insertion Quality Determinator 1>

Referring to FIG. 1, the insertion quality determinator 1 determines the insertion quality of the insertion component 5 based on the positional data detected by the position sensor 2. The insertion quality determinator 1 includes the processor Pr and the memory Me.

Referring to FIG. 2, the insertion quality determinator 1 includes an input part 12, a storage part 13, a positional data acquiring part 14, a determining part 15, and an output part 16. The storage part 13, the positional data acquiring part 14, and the determining part 15 are constituted by an arithmetic unit 11 which includes the processor Pr and the memory Me. For example, the arithmetic unit is constituted by a computer or a microcontroller. For example, the processor Pr is constituted by a CPU, an MPU, an FPGA (Field Programmable Gate Array), or a PLC (Programmable Logic Controller). For example, the memory Me is constituted by a ROM, a RAM, an external storage device (hard disk drive), etc. The positional data acquiring part 14 and the determining part 15 are functional blocks which are implemented by the processor Pr reading and executing a given analysis program stored in the memory Me. The storage part 13 is constituted by the memory Me. For example, the input part 12 and the output part 16 are constituted by peripheral equipment of a computer. For example, the input part 12 is constituted by a keyboard, a mouse, a touch panel, a microphone, etc. For example, the output part 16 is constituted by a display, a printer, a modem, a speaker, etc.

Here, the input part 12 is used for, for example, the operator of the robot 3 inputting a reference position of the given part (described later). Here, the storage part stores the reference position inputted from the input part 12. Here, for example, the reference position of the given part is a position of the given part which is acquired from design data of the insertion component 5, or a position of the given part as seen in the extending direction of the body 5b in a state where the insertion component 5 is not inserted into the hole 4a.

The positional data acquiring part 14 acquires the positional data outputted from the position sensor 2.

The determining part 15 determines the insertion quality of the insertion component 5 based on a deviation of the positional data acquired by the positional data acquiring part 14 from the reference position read from the storage part 13. Here, although the insertion quality is determined as "good (acceptable or normal)" or "defect (failure or abnormal)," the insertion quality may be represented by three or more ranks and the rank is determined correspondingly.

The output part 16 outputs the determination result.

[Operation]

Next, operation of the robot system 200 (a method of determining the insertion quality) configured as described above is described. FIGS. 7(a) to 7(f) are schematic diagrams schematically illustrating the shape of the given part of the head, as seen in the extending direction of the hole, when the insertion components which are various kinds of viscoelastic components are inserted appropriately. FIGS.

8(a) to 8(f) are schematic diagrams schematically illustrating the shape of the given part of the head, as seen in the extending direction of the hole, when the insertion components which are various kinds of viscoelastic components are incliningly inserted.

Referring to FIGS. 1 to 4, the robot 3 holds the insertion component 5 by the component inserting tool 32 of the end effector 31, and inserts it into the hole 4a of the work object 4 in the extending direction of the hole 4a.

Referring to FIG. 3, when the insertion component 5 is inserted appropriately (normally), the insertion component 5 is attached to the work object 4 so that the extending direction of the body 5b becomes in agreement with the extending direction of the hole 4. In this case, as illustrated in FIG. 7(a), the shape of the head 5a of the insertion component 5 as seen in the extending direction of the hole 4a becomes a similar shape to the shape of the head in a state where the insertion component 5 is not inserted into the hole 4a, or the shape based on the design data. In FIG. 7(a), P1-P4 indicate the given parts of the head 5a. Note that, if the insertion component 5 is viscoelastic as described, the head 5a becomes smaller than the original state when the insertion component is inserted appropriately. Therefore, if the insertion component 5 is inserted in a state where it is floated as a whole, the head 5a will not be much smaller than the original state.

Figure 4:
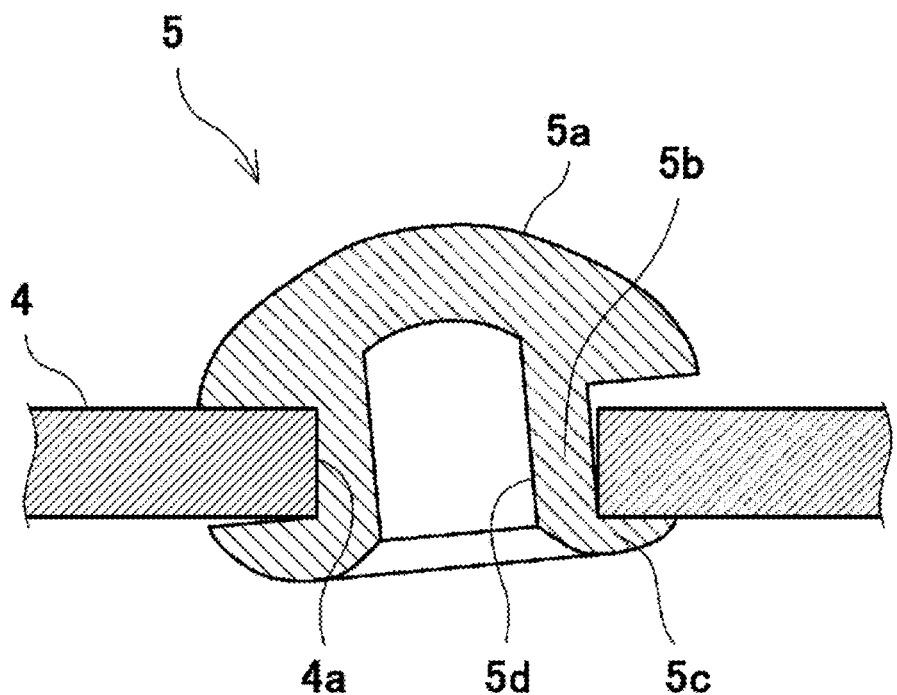
FIG. 4 is a cross-sectional view illustrating a state where the insertion component is inciningly inserted into the hole of the work object.

On the other hand, referring to FIG. 4, if the insertion component 5 is inclningly inserted (badly (abnormally)), the insertion component 5 is attached to the work object 4 so that the head 5a inclines with respect to the extending direction of the hole 4. In this case, as illustrated in FIG. 8(a), the shape of the head 5a of the insertion component 5 as seen in the extending direction of the hole 4a becomes a shape distorted from the shape of the head in the state where the insertion component 5 is not inserted into the hole 4a, or the shape based on the design data. In FIG. 8(a), P1-P4 indicate the given parts of the head 5a.

Next, the robot 3 moves the position sensor 2, for example, at a given position distant from the hole 4a in the extending direction of the hole 4a, in two radial directions which are perpendicular to each other at the center of the hole 4a. For example, in FIGS. 7(a) and 8(a), these two radial directions are assumed to be a direction connecting the given part P1 and the given part P3, and a direction connecting the given part P1 and the given part P4.

The position sensor 2 sequentially outputs a distance between the position sensor 2 and the work object 4 into which the insertion component 5 was inserted (the height of the surface of the work object 4) as a series of positional data.

The positional data acquiring part 14 acquires the series of positional data sequentially outputted from the position sensor 2.

The determining part 15 extracts the given parts P1-P4 based on the change in the distance between the position sensor 2 and the work object 4 (the height of the surface of the work object 4) in the series of positional data, and identifies the positions. The positions of the given parts P1-P4 are identified, for example, based on the position of the position sensor 2 (it can be identified in the coordinate system of the robot 3), and a distance between the position sensor 2 and each of the given parts P1-P4.

Next, the determining part 15 calculates deviations of the given parts P1-P4 from the reference positions of the given parts P1-P4. The deviation becomes smaller to some extent when the insertion component 5 is inserted appropriately, and it becomes larger when the insertion component 5 is inclningly (badly) inserted. Further, if the insertion component 5 is inserted into the state where it is floated as a whole, the deviation will not become much smaller.

Then, the determining part 15 determines that the insertion quality is good (normal) when the deviation falls within a given range, and it determines that the insertion quality is defect (abnormal) when the deviation becomes outside the given range.

Note that, although in the above case the specific part(s) on the outer circumference of the head 5a is used as the given part(s), specific part(s) on an annular protrusion 5e or an annular recess 5d which extend along the outer circumference of the head 5a of the insertion component 5 as illustrated in FIGS. 6(a) and 6(b) may also be used. Further, the insertion component 5 may be a threaded component.

As described above, according to Embodiment 1, the deviation of the position of the outer circumference of the head 5a, or the position of the annular protrusion or recess which extends along the outer circumference of the head 5 from the position of the part acquired from the design data of the insertion component 5, or the position of the part as seen in the extending direction of the body 5b in the state where the insertion component 5 is not inserted into the hole 4a reflects the distortion of the head 5a as seen in the extending direction of the hole 4a or the thinness of the head 5a, the insertion quality can be determined exactly.

Further, the insertion quality can be determined easily.

Embodiment 2

Figure 5:
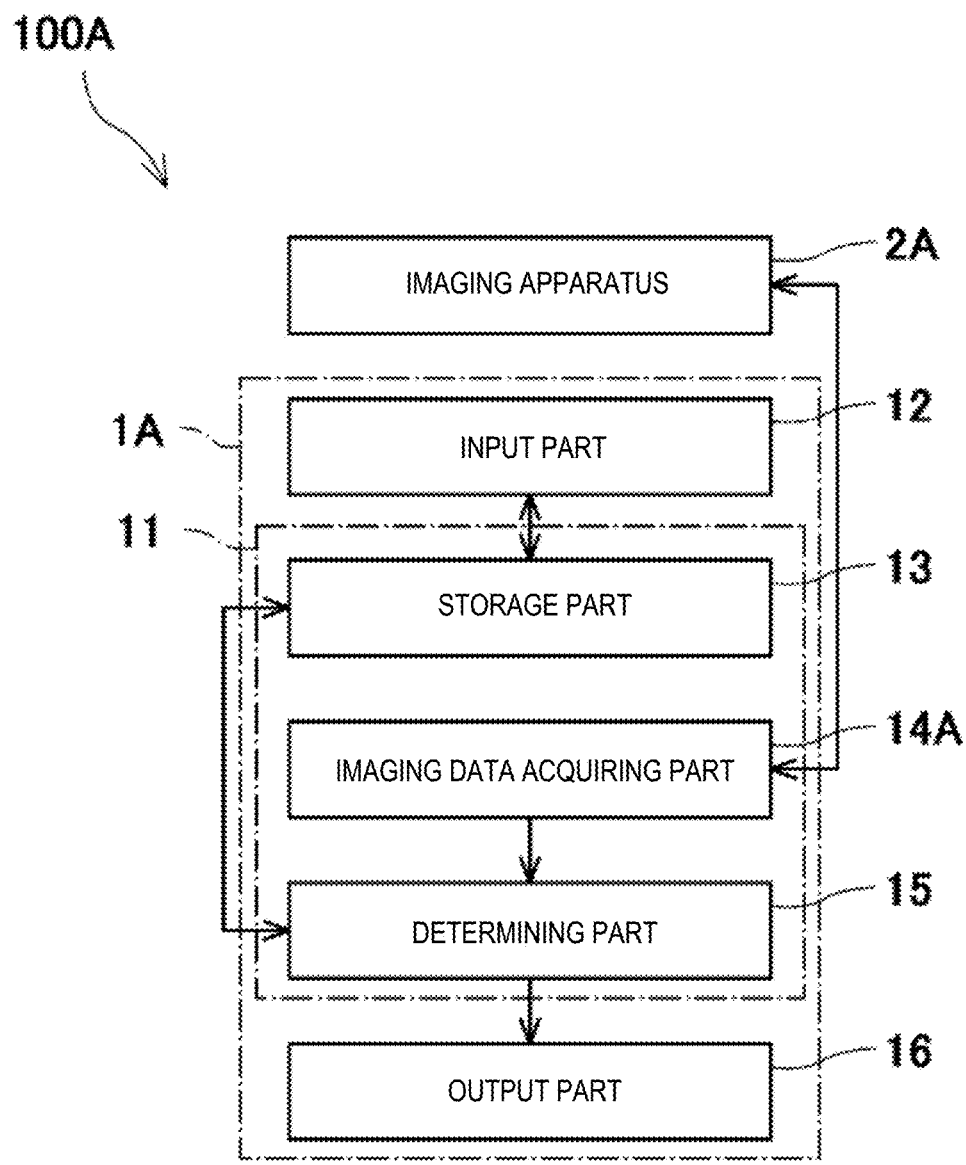
FIG. 5 is a functional block diagram illustrating a configuration of an insertion quality determining device according to Embodiment 2 of the present disclosure.

Embodiment 2 of the present disclosure is similar to Embodiment 1, but it is different from Embodiment 1 in that the position sensor 2 is an imaging apparatus 2A, and the determining part 15 determines the insertion quality based on a dimensional distribution of the given part of the head 5a. Below, the differences are described. FIG. 5 is a functional block diagram illustrating a configuration of an insertion quality determining device according to Embodiment 2 of the present disclosure.

Referring to FIG. 2, an insertion quality determining device 100A of Embodiment 2 is comprised of the imaging apparatus 2A as the position sensor, and an insertion quality determinator 1A.

The imaging apparatus 2A is, for example, comprised of a monocular camera or a stereo camera. The imaging apparatus 2A images, in the extending direction of the hole 4a, the insertion component 5 which is inserted into the hole 4a of the work object 4, and outputs the imaging data indicative of the captured image.

An imaging data acquiring part 14A acquires the imaging data.

The determining part 15 calculates the dimensional distribution of the given part of the head 5a of the insertion component 5 based on the imaging data acquired by the imaging data acquiring part 14A, and determines the insertion quality based on the calculated dimensional distribution of the given part.

Below, this is described in detail. FIGS. 6(a) and 6(b) are perspective views illustrating other examples of the insertion component 5. FIG. 6(a) illustrates a grommet 5. The grommet 5 has the shape similar to the rubber plug 5 of FIG. 3 as a whole. However, the grommet 5 has a through-hole 5d at the center, into which wiring is inserted. When the grommet 5 is seen in the extending direction of the body 5b (hereinafter, referred to as "the plan view"), an annular (here, circular-annular) belt-like part exists between the outer circumference of the head 5*a* and the outer circumference of the through-hole 5*d*.

Figure 6:
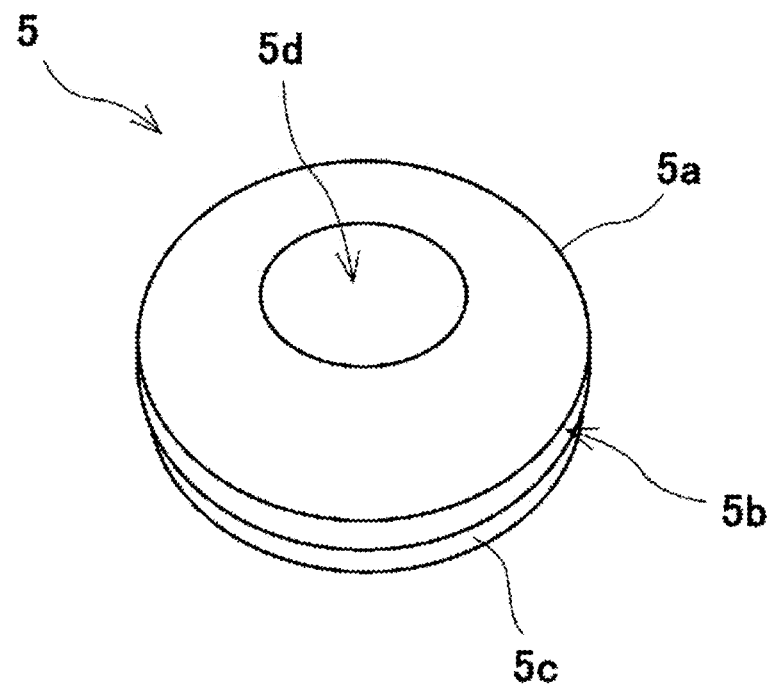
FIGS. 6(a) and 6(b) are perspective views illustrating other examples of the insertion component.
Figure 6:
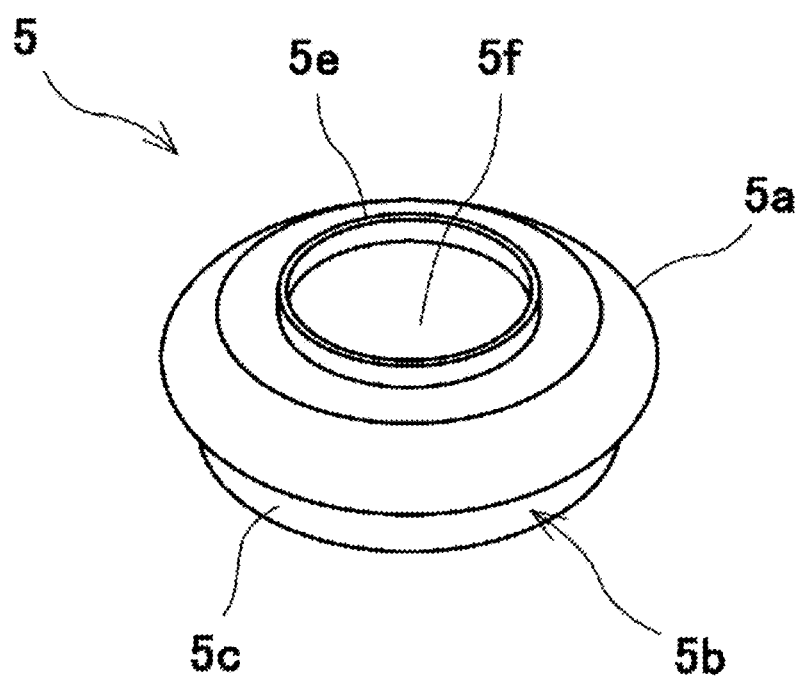

FIG. 6(*b*) illustrates a grommet with membrane. The grommet 5 with membrane has the annular protrusion 5*e* in the head 5*a*. A part inside this protrusion 5*e* is a membrane part 5*f*, and after the grommet 5 with membrane is attached to the work object 4, the membrane part 5*f* is removed and wiring etc. is inserted therein. When the grommet 5 with membrane is seen in the plan view, an annular (here, circular-annular) belt-like part exists between the outer circumference of the head 5*a* and the outer circumference of the protrusion 5*f*.

Here, FIGS. 7(*a*) to 7(*f*) schematically illustrate a plan-view shape of the head 5*a* when the insertion component 5 is inserted appropriately, and the plan-view shapes of the heads of various kinds of the insertion components 5 will be described below, while conveniently utilizing these drawings.

In Embodiment 2, this belt-like part is the given part. Further, in the case of the rubber plug 5 illustrated in FIG. 3, the shape of the head 5*a* in the plan view is circular as illustrated in FIG. 7(*a*), but in Embodiment 2, it is treated as the belt-like part which extends in the circumferential direction between the outer circumference of the head 5*a* and the center of the head 5*a*. In this case, as illustrated by arrows in FIG. 7(*a*), the radius becomes a width of this belt-like part.

Figure 7:
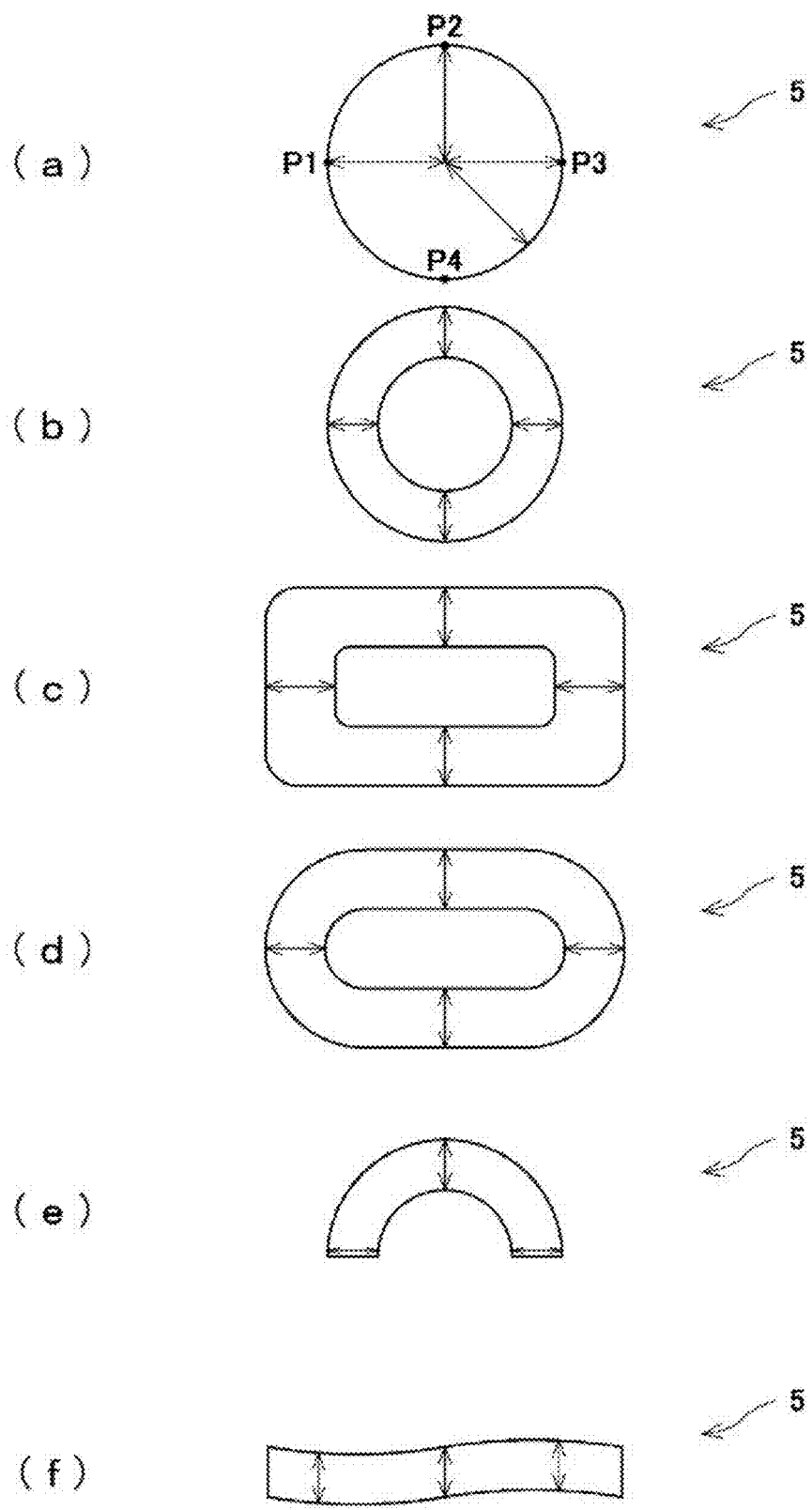
FIGS. 7(a) to 7(f) are schematic diagrams schematically illustrating the shape of a given part of a head, as seen in an extending direction of the hole, when insertion components which are various kinds of viscoelastic components are inserted appropriately.

FIG. 7(*b*) illustrates a conceptual diagram of the belt-like part of the grommet 5 and the grommet 5 with membrane as described above.

Although the hole 4*a* has various cross-sectional shapes, the grommet 5, the grommet 5 with membrane, and the rubber plug 5 have the head 5*a* with a plan-view shape which is substantially similar to the various cross-sectional shapes of the hole 4*a*. FIGS. 7(*c*) to 7(*f*) illustrate the plan-view shape of the head 5*a* which is substantially similar to the various cross-sectional shapes of the hole 4*a*.

When the above explanation is generalized, in Embodiment 2, the given part of the head 5 of the insertion component 5 inserted into the hole 4*a* is the belt-like part defined by the outer circumference of the head 5*a*, and the protrusion or the recess extending along the outer circumference, and the dimensional distribution of the given part is a width distribution of this belt-like part in the extending direction. Here, "the belt-like part defined by the outer circumference of the head 5*a*, and the protrusion or the recess extending along the outer circumference" means, as seen in the extending direction of the hole 4*a*, the belt-like part which is defined by the outer circumference of the head 5*a* and the center of the head 5*a*, and extends along the outer circumference, and the belt-like part which is defined by the outer circumference, and two of the one or more protrusions or recesses which extend along the outer circumference.

Figure 8:
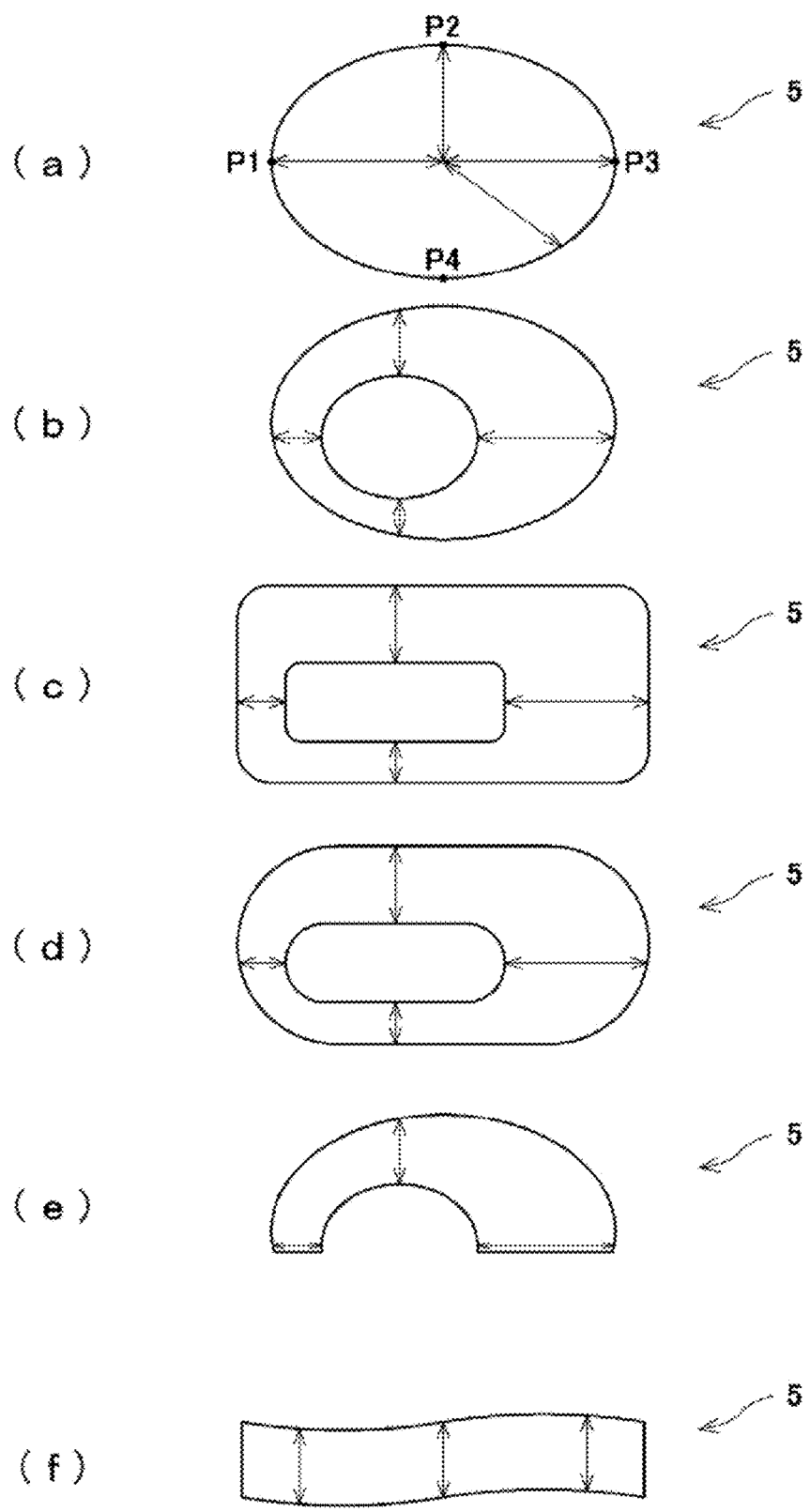
FIGS. 8(a) to 8(f) are schematic diagrams schematically illustrating the shape of the given part of the head, as seen in the extending direction of the hole, when the insertion components which are various kinds of viscoelastic components are inciningly inserted.

FIGS. 8(*a*) to 8(*f*) are schematic diagrams schematically illustrating plan-view shapes of the belt-like part of the head 5*a* when the insertion components 5 which are various kinds of viscoelastic components are incliningly inserted. FIGS. 8(*a*) to 8(*f*) correspond to FIGS. 7(*a*) to 7(*f*), respectively. Note that, in FIGS. 7(*a*) to 7(*f*) and FIGS. 8(*a*) to 8(*f*), arrows indicate the width.

As illustrated in FIGS. 6(*a*) and 6(*b*), the width of the belt-like part of the head 5*a* of the insertion component 5 is substantially uniform in the extending direction. Therefore, when the insertion component 5 which is a viscoelastic component is incliningly inserted, the head is distorted as seen in the extending direction of the hole. Alternatively, in the case of the threaded component, the head becomes thinner. In this case, since the width distribution of the belt-like part in the extending direction emphasizingly reflects the distortion of the head 5 as seen in the extending direction or the thinness of the head, the insertion quality can be determined with sufficient accuracy. In addition, when the head is distorted as seen in the extending direction of the hole 4*a*, or the head becomes thinner, the dimensional distribution of the belt-like part of the head 5*a* of the insertion component 5 becomes a distribution according to the distortion or the thinness. Therefore, the insertion quality can be determined based only on the dimensional distribution of the belt-like part of the head 5*a*.

In detail, for example, the determining part 15 extracts the belt-like part from the imaging data by image processing, calculates a plurality of widths at a given interval in the extending direction of the extracted belt-like part, and calculates an average value and a standard deviation of the plurality of widths. When the insertion component 5 is incliningly inserted, the standard deviation becomes larger. Thus, the determining part 15 determines that the insertion quality determination is "defect (abnormal)" when the standard deviation is larger than a given threshold standard deviation, and otherwise, it determines that the insertion quality is "good (normal)."

On the other hand, when the insertion component 5 is floatingly inserted, the average value becomes larger. Thus, the determining part 15 determines that the insertion quality is "defect (abnormal)" when the average value is larger than a given threshold average value, and otherwise, it determines that the insertion quality is "good (normal)." The given threshold standard deviation and the given threshold average value are determined by an experiment, a simulator, a calculation, etc.

Note that the insertion component 5 may be the threaded component. Also in this case, the insertion quality can be determined similar to the above.

As described above, according to Embodiment 2, the insertion quality can be determined easily.

Other Embodiments

In Embodiment 1, the insertion components may be the grommet or the grommet with membrane.

In Embodiment 2, a variation in the width may be used instead of the threshold standard deviation of the width. For example, a mean deviation of the width may be used.

It is apparent for the person skilled in the art that many improvements and other embodiments are possible from the above description. Therefore, the above description is to be interpreted only as illustration.

Operation and Effects of Embodiments

As described above, according to the embodiments of the present disclosure, in the insertion quality determinator 1, the determination of the insertion quality based on the position of the given part of the head 5*a* of the insertion component 5 inserted into the hole 4*a* in the direction perpendicular to the extending direction of the hole 4*a* formed in the work object 4 is the determination of the insertion quality based on the dimensional distribution of the given part of the head 5*a* of the insertion component 5 inserted into the hole 4*a*, or the deviation of the position of the given part from the reference position in the direction perpendicular to the extending direction of the hole 4*a*. Here, since the "dimension" is determined by two "positions," it is a subordinate concept of the "position."

According to this configuration, when the head 5a is distorted as seen in the extending direction of the hole 4a, or the head 5a becomes thinner, the dimensional distribution of the given part of the head 5a of the insertion component 5 becomes the distribution according to the distortion or the thinness. Therefore, according to this configuration, the insertion quality can be determined based only on the dimensional distribution of the given part of the head 5a.

Further, when the head 5a is distorted as seen in the extending direction of the hole 4a, or the head 5a becomes thinner, the deviation of the position of the given part of the head 5a of the insertion component 5 from the reference position becomes according to the distortion or the thinness. Therefore, according to this configuration, the insertion quality can be determined based on the deviation of the position of the given part of the head 5a from the reference position.

Further, the determination of the insertion quality based on the position of the given part of the head 5a of the insertion component 5 inserted into the hole 4a in the direction perpendicular to the extending direction of the hole 4a is the determination of the insertion quality based on the dimensional distribution of the given part of the head 5a of the insertion component 5 inserted into the hole 4a in the direction perpendicular to the extending direction of the hole 4a. The given part of the head 5a of the insertion component 5 inserted into the hole 4a is the belt-like part defined by the outer circumference of the head 5a, and the protrusion or the recess extending along the outer circumference, and the dimensional distribution of the given part is the width distribution of the belt-like part in the extending direction. Here, "the belt-like part defined by the outer circumference of the head, and the protrusion or the recess extending along the outer circumference" means, as seen in the extending direction of the hole 4a, the belt-like part which is defined by the outer circumference of the head 5a and the center of the head 5a, and extends along the outer circumference, and the belt-like part which is defined by the outer circumference, and two of the one or more protrusions or recesses which extend along the outer circumference.

According to this configuration, since the width distribution of the belt-like part in the extending direction emphasizingly reflects the distortion of the head 5a as seen in the extending direction of the hole 4a or the thinness of the head 5a, the insertion quality can be determined with sufficient accuracy.

Further, the determination of the insertion quality based on the position of the given part of the head 5a of the insertion component 5 inserted into the hole 4a in the direction perpendicular to the extending direction of the hole 4a is the determination of the insertion quality based on the dimensional distribution of the given part of the head 5a of the insertion component 5 inserted into the hole 4a in the direction perpendicular to the extending direction of the hole 4a. The given part of the head 5a of the insertion component 5 inserted into the hole 4a is the annular belt-like part which extends in the circumferential direction, and the dimensional distribution of the given part is the width distribution of the belt-like part in the extending direction.

Further, the insertion quality determinator 1 determines the insertion quality based on the variation in the width distribution of the belt-like part in the extending direction. The "variation in the width distribution" may be a standard deviation or a mean deviation.

Moreover, the insertion quality determinator 1 determines the insertion quality based on the average value of the width distribution of the belt-like part in the extending direction.

The dimension of the given part of the head 5a of the insertion component 5 inserted into the hole 4a in the direction perpendicular to the extending direction of the hole 4a is the dimension of the given part of the head 5a of the inserted insertion component 5 in the captured image which is obtained by imaging the insertion component 5 inserted into the hole 4a in the extending direction of the hole 4a.

According to this configuration, it can acquire the appropriate dimensional accuracy according to the resolution of the captured image and the dimensional distribution which is substantially continuous.

Further, the insertion quality determinator 1 includes the imaging data acquiring part 14A which acquires the imaging data indicative of the captured image which is obtained by imaging the insertion component 5 inserted into the hole 4a in the extending direction of the hole 4a, and the determining part 15 which calculates the dimensional distribution of the given part of the head 5a of the insertion component 5 based on the imaging data acquired by the imaging data acquiring part 14A, and determines the insertion quality based on the calculated dimensional distribution of the given part.

According to this configuration, the insertion quality can be determined concretely based on the dimensional distribution of the given part of the head 5a of the insertion component 5.

Moreover, the determination of the insertion quality based on the position of the given part of the head 5a of the insertion component 5 inserted into the hole 4a in the direction perpendicular to the extending direction of the hole 4a is the determination of the insertion quality based on the deviation of the position of the given part of the head 5a of the insertion component 5 inserted into the hole 4a from the reference position in the direction perpendicular to the extending direction of the hole 4a. The given part of the head 5a of the insertion component 5 inserted into the hole 4a is the outer circumference of the head 5a, or the annular protrusion or recess which extends along the outer circumference of the head 5a. The reference position of the given part is the position of the given part acquired from the design data of the insertion component, or the position of the given part when seen in the extending direction of the body 5b in the state where the insertion component 5 is not inserted into the hole 4a.

According to this configuration, the deviation of the position of the outer circumference of the head 5a or the annular protrusion or recess which extends along the outer circumference of the head 5a from the position of the same part acquired from the design data of the insertion component 5 or the same part when seen in the extending direction of the body 5b in the state where the insertion component 5 is not inserted into the hole 4a reflects the distortion of the head 5a as seen in the extending direction of the hole 4a or the thinness of the head 5a, and therefore, the insertion quality can be determined exactly.

Further, the insertion quality determinator 1 includes the positional data acquiring part 14 which acquires the positional data indicative of the position of the given part of the head 5a of the insertion component 5 inserted into the hole 4a, the storage part 13 which stores the reference position, and the determining part 15 which calculates the deviation of the given part of the head 5a of the insertion component 5 from the reference position based on the positional data acquired by the positional data acquiring part 14 and the reference position stored in the storage part 13, and determines the insertion quality based on the calculated deviation of the given part from the reference position.

According to this configuration, based on the deviation of the position of the given part of the head 5a of the insertion component 5 from the reference position, the insertion quality can be determined concretely.

Further, the insertion component 5 is viscoelastic, and the head 5a is deformed by the body 5b being inserted into the hole 4a while being viscoelastically reduced in the diameter.

According to this configuration, since the deformation mode of the head 5a differs depending on the quality of insertion into the hole 4a, the present disclosure is suitably applicable.

Further, the insertion component 5 has the retainer part 5c at the tip end of the body 5b, which is thicker than the body 5b.

According to this configuration, because the retainer part 5c is provided, it is difficult to insert the insertion component 5 into the hole 4a and it is easy to cause a poor insertion, the present disclosure presents the prominent effect.

Further, the insertion component 5 is the grommet or the rubber plug.

According to this configuration, the present disclosure is suitably applicable.

Moreover, the hole 4a is the threaded hole, and the insertion component 5 is the threaded component.

According to this configuration, since the threaded component may be incliningly thrust into the threaded hole, the present disclosure is suitably applicable.

INDUSTRIAL APPLICABILITY

The insertion quality determinator, the insertion quality determining device, the robot system, and the method of determining the insertion quality according to the present disclosure are useful as an insertion quality determinator, an insertion quality determining device, a robot system, and a method of determining an insertion quality, capable of easily determining the quality of insertion of an insertion component into an insertion hole.

What is claimed is:

1. An insertion quality determinator that determines a quality of insertion of an insertion component inserted into a hole formed in a work object,
    wherein the insertion component at least includes a head having the size that is impossible to be inserted into the hole, and a pillar-shaped body that extends from the head and has the thickness that is possible to be inserted into the hole, and
wherein the determinator determines the quality of insertion based on the position of a given part of the head of the insertion component inserted into the hole in a direction perpendicular to an extending direction of the hole,
    wherein the determination of the quality of insertion is
       a determination of the quality of insertion based on a dimensional distribution of the given part of the head of the insertion component inserted into the hole, in the direction perpendicular to the extending direction of the hole or
       a determination of the quality of insertion based on a deviation of the position of the given part of the head of the insertion component inserted into the hole from a reference position in the direction perpendicular to the extending direction of the hole,
    wherein the dimension of the given part is a dimension determined by two positions of the given part, and
    wherein the reference position is a position of the given part acquired from desi n data of the insertion component or a position of the given part when seen in an extending direction of the body in a state where the insertion component is not inserted into the hole.

2. The insertion quality determinator of claim 1, wherein the determination of the quality of insertion based on the position of the given part of the head of the insertion component inserted into the hole in the direction perpendicular to the extending direction of the hole is the determination of the quality of insertion based on the dimensional distribution of the given part of the head of the insertion component inserted into the hole in the direction perpendicular to the extending direction of the hole,
    wherein the given part of the head of the insertion component inserted into the ho is a belt-like part defined by an outer circumference of the head, and a protrusion or a recess extending along the outer circumference, and
    wherein the dimensional distribution of the given part is a width distribution of the belt-like part in the extending direction of the hole.

3. The insertion quality determinator of claim 1, wherein the determination of the quality of insertion based on the position of the given part of the head of the insertion component inserted into the hole in the direction perpendicular to the extending direction of the hole is the determination of the quality of insertion based on the dimensional distribution of the given part of the head of the insertion component inserted into the hole in the direction perpendicular to the extending direction of the hole,
    wherein the given part of the head of the insertion component inserted into the hole is an annular belt-like part extending in the circumferential direction, and
    wherein the dimensional distribution of the given part is a width distribution of the belt-like part in the extending direction.

4. The insertion quality determinator of claim 2, wherein the quality of insertion is determined based on a variation in the width distribution of the belt-like part in the extending direction.

5. The insertion quality determinator of claim 2, wherein the quality of insertion is determined based on an average value of the width distribution of the belt-like part in the extending direction.

6. The insertion quality determinator of claim 1, wherein the dimension of the given part of the head of the insertion component inserted into the hole in the direction perpendicular to the extending direction of the hole is a dimension of the given part of the head of the inserted insertion component in a captured image obtained by imaging the insertion component inserted into the hole in the extending direction of the hole.

7. The insertion quality determinator of claim 1, comprising:
    imaging data acquiring circuitry that acquires imaging data indicative of a captured image obtained by imaging the insertion component inserted into the hole in the extending direction of the hole; and
    determining circuitry that calculates the dimensional distribution of the given part of the head of the insertion component based on the imaging data acquired by the imaging data acquiring circuitry, and determines the quality of insertion based on the calculated dimensional distribution of the given part.

8. The insertion quality determinator of claim 1, wherein the determination of the quality of insertion based on the position of the given part of the head of the insertion component inserted into the hole in the direction perpendicular to the extending direction of the hole is the determination of the quality of insertion based on the deviation of the position of the given part of the head of the insertion component inserted into the hole from the reference position in the direction perpendicular to the extending direction of the hole, wherein the given part, of the head of the insertion component inserted into the hole is the outer circumference of the head, or an annular protrusion or recess extending along the outer circumference of the head, and wherein the reference position of the given part is a position of the given part acquired from design data of the insertion component, or a position of the given part when seen in an extending direction of the body in a state where the insertion component is not inserted into the hole.

9. The insertion quality determinator of claim 1, comprising:
a positional data acquiring circuitry that acquires positional data indicative of the position of the given part of the head of the insertion component inserted into the hole;
a memory that stores the reference position; and
determining circuitry that calculates the deviation of the position of the given part of the head of the insertion component from the reference position based on the positional data acquired by the positional data acquiring circuitry, and the reference position stored in the memory, and determines the quality of insertion based on the calculated deviation of the position of the given part from the reference position.

10. The insertion quality determinator of claim 1, wherein the insertion component is viscoelastic, and the head is deformed as the body is inserted into the hole, while being viscoelastically reduced in the diameter.

11. The insertion quality determinator of claim 10, wherein the insertion component has a retainer at a tip end of the body, the retainer being thicker than the body.

12. The insertion quality determinator of claim 10, wherein the insertion component is a grommet or a rubber plug.

13. The insertion quality determinator of claim 1, wherein the hole is a threaded hole, and the insertion component is a threaded component.

14. An insertion quality determining device, comprising:
an imaging apparatus that images a captured image of the insertion component inserted into the hole, seen in the extending direction of the hole, and outputs imaging data indicative of the captured image; and
the insertion quality determinator of claim 1,
wherein the determinator acquires the position of the given part of the head of the insertion component inserted into the hole in the direction perpendicular to the extending direction of the hole based on the imaging data outputted from the imaging apparatus.

15. A robot system, comprising:
a robot including a robotic arm having an end effector that inserts the insertion component into the hole of the work object; and
the insertion quality determining device of claim 14,
wherein the imaging apparatus is installed in an object other than the end effector, the robotic arm, or the robot.

16. An insertion quality determining method of determining a quality of insertion of an insertion component inserted into a hole formed in a work object, the insertion component at least including a head having the size that is impossible to be inserted into the hole, and a pillar-shaped body that extends from the head and has the thickness that is possible to be inserted into the hole, comprising the steps of:
inserting the insertion component into the hole; and
determining the quality of insertion based on the position of a given part, of the head of the insertion component inserted into the hole in a direction perpendicular to an extending direction of the hole,
wherein the determination of the quality of insertion is
a determination of the quality of insertion based on a dimensional distribution of the given part of the head of the insertion component inserted into the hole, in the direction perpendicular to the extending direction of the hole or
a determination of the quality of insertion based on a deviation of the position of the given part of the head of the insertion component inserted into the hole, from a reference position in the direction perpendicular to the extending direction of the hole,
wherein the dimension of the given part is a dimension determined by two positions of the given part, and
wherein the reference position is a position of the given part acquired from design data of the insertion component or a position of the given part when seen in an extending direction of the body in a state where the insertion component is not inserted into the hole.

17. An insertion quality determination device that determines a quality of insertion of an insertion component inserted into a hole formed in a work object,
wherein the insertion component at least includes a head having the size that is impossible to be inserted into the hole, and a pillar-shaped body that extends from the head and has the thickness that is possible to be inserted into the hole,
the insertion quality determination device comprising:
circuitry configured to determine the quality of insertion based on the position of a given part of the head of the insertion component inserted into the hole in a direction perpendicular to an extending direction of the hole,
wherein the determination of the quality of insertion is
a determination of the quality of insertion based on a dimensional distribution of the given part of the head of the insertion component inserted into the hole, in the direction perpendicular to the extending direction of the hole or
a determination of the quality of insertion based on a deviation of the position of the given part of the head of the insertion component inserted into the hole, from a reference position in the direction perpendicular to the extending direction of the hole,
wherein the dimension of the given part is a dimension determined by two positions of the given part, and
wherein the reference position is a position of the given part acquired from design data of the insertion component or a position of the given part when seen in an extending direction of the body in a state where the insertion component is not inserted into the hole.

* * * * *